A. GERLEIT.
VEHICLE WHEEL.
APPLICATION FILED AUG. 7, 1912.
1,066,267.
Patented July 1, 1913.
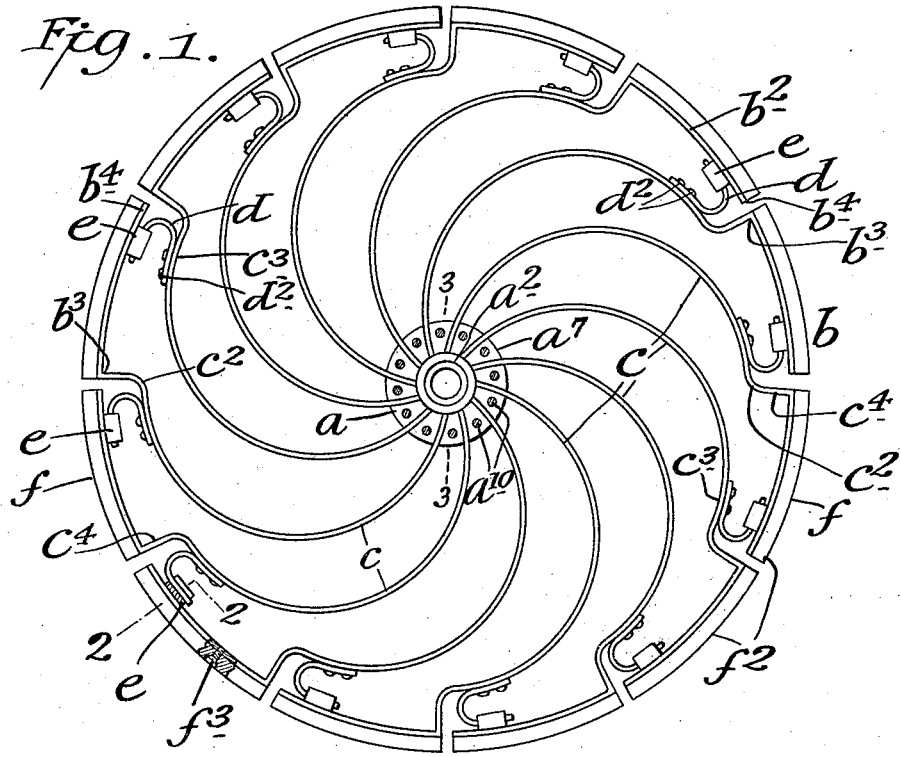
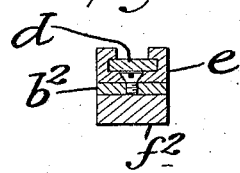
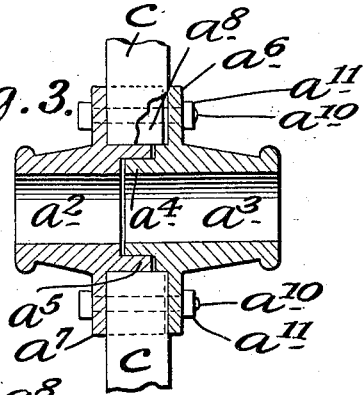

UNITED STATES PATENT OFFICE.

AUGUST GERLEIT, OF NEW YORK, N. Y.

VEHICLE-WHEEL.

1,066,267. Specification of Letters Patent. Patented July 1, 1913.

Application filed August 7, 1912. Serial No. 713,701.

*To all whom it may concern:*

Be it known that I, AUGUST GERLEIT, a citizen of the United States, and residing at New York, in the county of New York and State of New York, have invented certain new and useful Improvements in Vehicle-Wheels, of which the following is a specification, such as will enable those skilled in the art to which it appertains to make and use the same.

This invention relates to vehicle wheels, and particularly to wheels of this class designed for use in connection with what are known as pleasure or passenger vehicles, and the object thereof is to provide an improved wheel for vehicles of this class, and of a class known as cushioned wheels, and in which the cushioning effect is produced by means of spirally formed elastic or resilient spokes connected with the hub and rim of the wheel, the rim of said wheel being also composed of separate parts or sections with which the spokes are connected in a novel manner, and with this and other objects in view the invention consists in a wheel of the class specified, constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a side view partially in section of a wheel constructed according to my invention; Fig. 2 a section on the line 2—2 of Fig. 1; Fig. 3 a section on the line 3—3 of Fig. 1; and, Fig. 4 an inside view of a part of a two-part hub which I employ in the construction of my improved wheel.

In the drawing forming part of this specification, I have shown a wheel comprising a hub $a$, a rim $b$ and spokes $c$, said hub, rim and spokes being constructed and connected as hereinafter described.

The hub $a$ comprises two parts or members $a^2$ and $a^3$, as clearly shown in Fig. 3, said hub members being provided centrally of the hub or at the inner end of each part, one with an inner annular rim $a^4$ and the other with an outer annular rim $a^5$ which overlaps the rim $a^4$, and the part $a^3$ is provided with an annular flange $a^6$, and the other part $a^2$ with an annular flange member $a^7$, and the flange member $a^7$ is provided in the face thereof adjacent to the flange $a^6$ with equally spaced sector projections or studs $a^8$ forming spiral grooves or recesses $a^9$ between which the inner ends of the spokes $c$ fit, and said spokes are bound to or in the hub and the separate parts $a^2$ and $a^3$ of the hub are connected by bolts $a^{10}$ which are passed through the parts $a^6$, $a^7$ and $a^8$ between the inner ends of the spokes, and the relative transverse dimensions of the parts $a^8$ and the spokes $c$ are such that when the separate parts of the hub are bound together by the bolts $a^{10}$ the flange $a^6$ of the part $a^3$ presses on the lateral side faces of the spokes, as clearly shown in Fig. 3, and by reason of this construction the nuts $a^{11}$ on the bolts $a^{10}$ may be tightened at any time so as to securely bind the separate parts of the hub together and secure the spokes therein.

The spokes $c$ are flat and oblong and rectangular in cross section, and are of spiral form and composed of spring steel or other suitable material, and the rim $b$ is composed of separate parts $b^2$ which equal in number the spokes $c$, and each rim member $b^2$ is connected at one end, integrally or otherwise, with a corresponding spoke, as clearly shown at $b^3$, each spoke inwardly of its connection with the corresponding rim member at $b^3$ is provided with an inwardly set elbow bend or curve $c^2$, and between the outer end portion $c^3$ of the spiral part of each spoke and the corresponding end $b^4$ of the next adjacent tire member is placed a bow-shaped spring $d$, one end of which is secured to the said spoke at $d^2$ by rivets, screws or otherwise, and the other end of which passes loosely through and is movable in a keeper $e$ secured to the free end portion of the corresponding rim member $b^2$.

The spring $d$ may be connected with the spoke member $c$ at $d^2$ in any desired manner, and it may also be connected with the corresponding rim member $b^2$ by means of the keeper $e$ or in any other desired way, but I prefer that this connection be so made as to permit the end of the spring $d$ which is secured to the free end portion of the corresponding rim member $b^2$ to have a slight sliding movement.

It will be observed that all the spokes or spoke members are connected with the rim members in the same way, the outer end of each spoke being provided with a radial portion $c^4$ which is connected with one end of a corresponding rim member and the curved part of each spoke adjacent to the radial portion $c^4$ being provided with a spring which bears on the free end portion of the next adjacent spoke member.

The wheel is also provided with a tire $f$ made of separate parts $f^2$ which correspond with and are secured to the separate tire members $b^2$ by means of bolts, screws or the like as shown at $f^3$, and the tire or tire members $f^2$ are preferably composed of leather or other suitable fibrous material, but my invention is not limited to the material of the tire or tire members nor to any particular means for securing the same to the rim member.

With the construction shown and described, it will be seen that the separate parts of the rim and tire have an inward or radial movement and also a slight circumferential movement, both of which movements are controlled by the curved form and resilient qualities of the spokes and by the supplemental spring connections $d$ which regulate the inward or radial movement of the free end portions of the tire members $b^2$, and the yoke-shaped spring connections $d$ serve to prevent the free end portions of the rim members $b^2$ from being forced inwardly to a greater extent than the other end portions of said rim members and these yoke-shaped springs also serve to equalize the pressure at all times on the separate rim members and to regulate the movement thereof.

A wheel made in this manner possesses all the desired elasticity of a cushioned wheel made in any other way, and the use of pneumatic tires will be obviated thereby, and it will be understood that the said wheel may be made of any desired capacity as to strength, or the weight to be supported thereby.

Having fully described my invention, what I claim as new and desire to secure by Letters Patent, is;—

1. A wheel provided with spiral spokes and a rim composed of separate parts equaling in number said spokes, the parts of the rim being connected at one end with corresponding spokes, and said spokes being provided adjacent to said end connections with inwardly set portions, and springs placed between said inwardly set portions of the spokes and the next adjacent rim members and secured to said spokes and to said rim members.

2. A wheel provided with spiral spokes and a rim composed of separate parts equaling in number said spokes, the parts of the rim being connected at one end with corresponding spokes, and said spokes being provided adjacent to said end connections with inwardly set portions, and springs placed between said inwardly set portions of the spokes and the next adjacent rim members and secured to said spokes and to said rim members, said springs being U-shaped in form and the connection thereof with the rim members being a sliding connection.

In testimony that I claim the foregoing as my invention I have signed my name in presence of the subscribing witnesses this 6th day of August, 1912.

AUGUST GERLEIT.

Witnesses:
A. R. APPLEMAN,
S. ANDREWS.